United States Patent
Tiesler et al.

(10) Patent No.: US 7,066,374 B2
(45) Date of Patent: Jun. 27, 2006

(54) SONIC WELD SUNROOF TRIM RING

(75) Inventors: John M. Tiesler, Harrison Township, MI (US); Jim Mestemaker, Lambertville, MI (US); Michael C. Dykman, Lake Orion, MI (US); Scott D. Arnold, Farmington Hills, MI (US)

(73) Assignee: Lear Corporation, Southfield, MI (US)

( * ) Notice: Subject to any disclaimer, the term of this patent is extended or adjusted under 35 U.S.C. 154(b) by 86 days.

(21) Appl. No.: 10/754,959

(22) Filed: Jan. 8, 2004

(65) Prior Publication Data

US 2005/0150930 A1    Jul. 14, 2005

(51) Int. Cl.
*B60J 7/43* (2006.01)
*B23K 1/06* (2006.01)

(52) U.S. Cl. .................. 228/110.1; 156/73.1; 296/214; 296/216.09

(58) Field of Classification Search ............ 228/110.1, 228/1.1; 156/73.1, 73.2; 296/218
See application file for complete search history.

(56) References Cited

U.S. PATENT DOCUMENTS

| | | | | |
|---|---|---|---|---|
| 4,231,609 A | * | 11/1980 | Sorensen | 296/218 |
| 4,618,516 A | * | 10/1986 | Sager | 428/542.8 |
| 5,108,147 A | | 4/1992 | Grimm et al. | |
| 6,124,886 A | * | 9/2000 | DeLine et al. | 348/148 |
| 6,135,535 A | * | 10/2000 | Tarahomi | 296/102 |
| 6,161,895 A | | 12/2000 | Jaeckle et al. | |

* cited by examiner

*Primary Examiner*—Jonathan Johnson
(74) *Attorney, Agent, or Firm*—Bill Panagos

(57) ABSTRACT

A method of installing trim rings to headliner trims systems in motor vehicles comprising a trim ring, a headliner, and a sonic horn and stack. The sonic horn vibrates to bond/weld headliner to trim ring. Energy directors can be added to facilitate bonding/welding process. Fasteners can also be added for attachment to the vehicle body. This bonding/welding of the headliner to trim ring creates a smooth, molded look for the trim ring and does so without gapping to or sliding within the headliner.

7 Claims, 2 Drawing Sheets

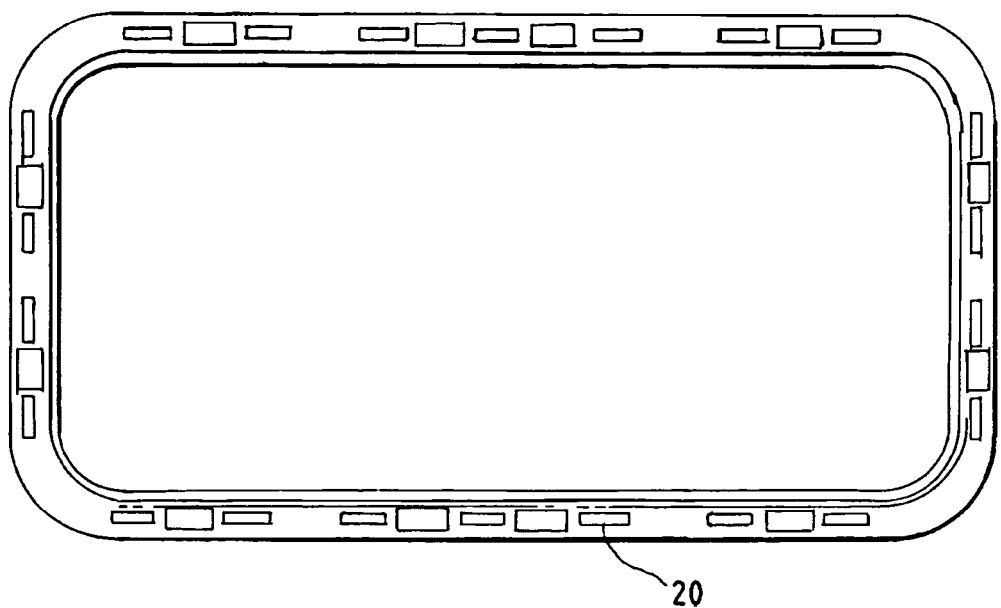
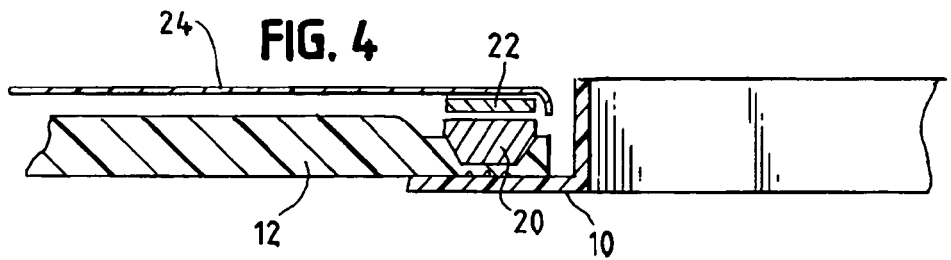

SONIC WELD SUNROOF TRIM RING

FIELD OF INVENTION

This invention relates to the field of sunroofs in motor vehicles. More specifically, it relates to an improved method of installing trim rings to headliner trim systems.

BACKGROUND OF INVENTION

Sunroofs are very popular in motor vehicles. In their sunroofs, consumers want a smooth, molded look to make them more aesthetically pleasing. As a result, there has been a constant demand for better ways of utilizing a sunroof opening within a motor vehicle's headliner. Normally, there is some sort of secondary seal or molding that is used to make a sunroof opening more acceptable in appearance. See U.S. Pat. No. 4,231,609. In the '609 patent, the trim ring is complementary to the frame and is attached to the frame by fasteners so as to finish the bottom surface. Others use edging to create the desired appearance. One example is found in U.S. Pat. No. 6,161,895. In the '895 patent, the invention recognized the problem of having a headliner with an opening such as a sunroof and solved the problem of an unsatisfactory appearance by utilizing pleated edging around the sunroof opening. U.S. Pat. No. 5,108,147 utilizes grooves for fastening the headliner of a motor vehicle to the roof frame with a lifting or sliding roof structure. The '147 patent uses a lower groove to receive the edge of the flange and the upper groove receives the edge of the cut out portion. This method also produces the look that consumers want.

The problem with these typical ways of installing sunroofs is that there is not always a quality fit or alignment of the trim ring to the headliner. There can be gapping or sliding of the trim ring within the opening of the headliner. This invention relates to an improved method of installing sunroofs within a motor vehicle. It solves the problem of gapping and sliding and reduces the cost of tools. This invention also allows for assembly at the manufacturers plant and not on line at the original equipment manufacturer. This invention completely eliminates the need for edge wrapping to get a molded look for the sunroof opening by sonically welding the sunroof trim ring to the headliner.

SUMMARY OF INVENTION

This invention relates to a method of installing trim rings to headliner trim systems comprising a trim ring, a headliner, and a sonic horn. This method allows for installation of trim rings, such as a sunroof trim ring, to achieve the smooth molded look consumers' desire, without any gapping or sliding.

This method of installing trim rings to headliner trim systems has the trim ring supported by a nest and the headliner is placed over the trim ring. The sonic horn vibrates to create the melt to bond/weld the trim ring to the headliner. The trim ring is bonded/welded at numerous points to the headliner.

The trim ring may further comprise energy directors to facilitate the bonding/welding process. These energy directors are small amounts of plastic that melt during the welding process to hold the trim ring and headliner together. Fasteners can also be added to the weld areas during to the bonding/welding process to provide for installation of the headliner to the vehicle body.

As a result of this invention, the trim ring is attached to the headliner trim system in a desired manner. There is no gapping or sliding within the opening of the headliner. Additionally, costs of tools are reduced and assembly can occur at the manufacturer's plant.

DETAILED DESCRIPTION OF THE DRAWINGS

FIG. 3 is an overhead view of weld areas.

FIG. 4 is a typical section through the assembly.

DETAILED DESCRIPTION OF THE PREFERRED EMBODIMENT

In its preferred embodiment, this invention will relate to sunroof trim rings. Many motor vehicles have sunroofs and this invention solves the common problem of the trim ring 10 gapping or sliding from the headliner 12 and causing an improper fit. Improper fits can not only result in an undesirable appearance, but can also cause light/wind leakage through the sunroof. By bonding/welding the trim ring 10 to the headliner 12, the problems of gapping or sliding are eliminated.

In its preferred embodiment, this method of installing a trim ting 10 to a headliner 12 comprises a trim ring 10, a headliner 12, and a sonic horn 14. The sonic horn 14 comprises a tuned piece of material, such as aluminum or titanium. The sonic horn 14 works by utilizing a transducer connected to a power supply to produce a frequency. Preferably, this frequency will range between 15,000 Hz and 40,000 Hz. This frequency causes the sonic horn 14 to vibrate.

Figure 1:
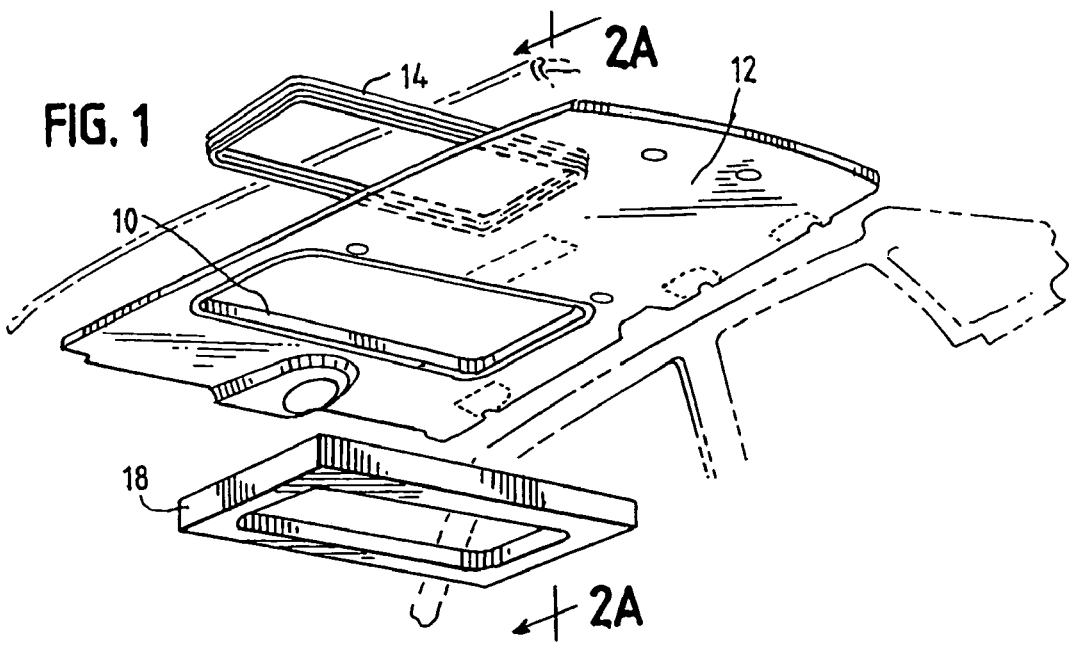
FIG. 1 depicts the trim ring within the headliner with nest.
Figure 2A:
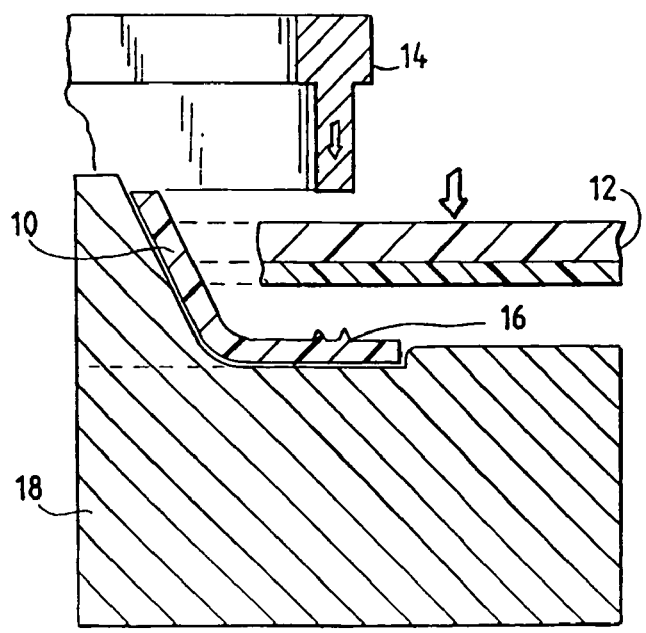
FIG. 2A depicts a backside view of headliner with the trim ring, headliner, and sonic horn.
Figure 2C:
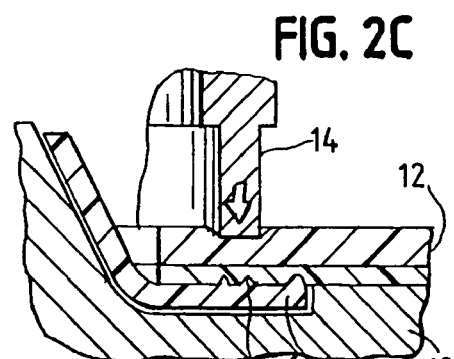
FIG. 2C depicts the sonic horn creating the melt.
Figure 2D:
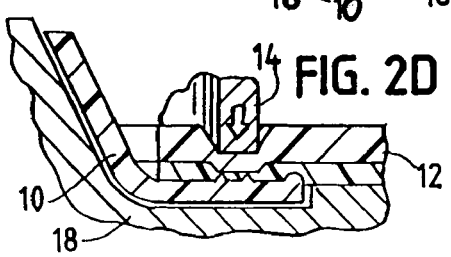
FIG. 2D depicts the sonic horn bonding/welding the headliner to the trim ring.
Figure 2B:
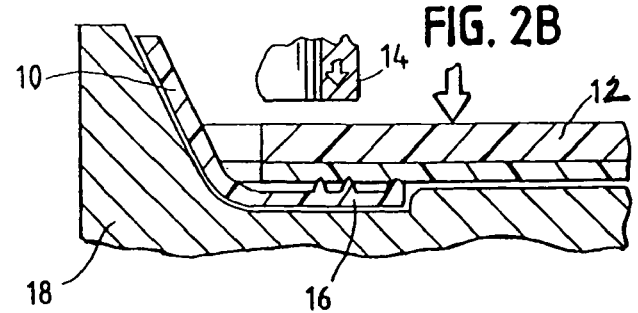
FIG. 2B depicts the headliner, trim ring, support nest and sonic horn beginning its bonding/welding cycle.
Figure 2E:
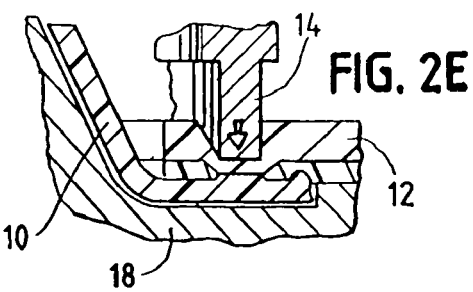
FIG. 2E depicts the sonic horn finishing the bonding/welding process.

To create a bond/weld area 20, the trim ring 10 is supported by a nest 18. The headliner 12 is then placed over the trim ring 10. FIGS. 2A through 2E depicts the motion of the sonic horn 14 to bond/weld the headliner 12 to the trim ring 10. As the sonic horn 14 vibrates, a melt is created that bonds/welds the headliner 12 to the trim ring 10. Energy directors 16 can be placed on the trim ring 10 to facilitate the welding process. These energy directors 16 are comprised of plastic. As the sonic horn 14 vibrates, the energy directors 16 will melt and assist in bonding/welding the headliner 12 to the trim ring 10.

To assist in attachment of the headliner 12 to the vehicle body, fasteners 22, such as Velcro or Dual Lock can be welded during this welding process, as seen in FIG. 4. If a fastener 22 is used, it is located in a position above the weld area 20. The bonding/welding process takes place as described above and these fasteners 22 are used to attach the headliner 12 onto the sunroof bracket 24. If a fastener 22 is used, this size of such fastener 22 is preferably 50 mm×25 mm. This is so it best fits within the sunroof bracket 24 and trim ring 10 and will not overhang or causes any undesirable appearances. These fasteners 22 are simply meant to provide attachment of the headliner 12 to the sunroof bracket 24 and are not meant to be seen by consumers.

The bond/weld areas 20 are to be located at various locations around the trim ring 10 edge. The number of bond/weld areas 20 needed to properly bond/weld a trim ring 10 to a headliner 12 will vary depending on the size of the trim ring 10. The size of the actual bond/weld area 20 will vary as well, but these weld areas are preferably 50 mm×10 mm to ensure a strong weld and to create the smooth, molded look consumers' desire.

The above presents a description of the best mode contemplated for carrying out this invention. The claims should not be read as limited to the described order or elements unless stated to that effect. Therefore, all embodiments that come with the scope and spirit of the following claims and equivalents thereto are claimed as the invention.

What is claimed is:

1. A method of installing a trim ring to a headliner of a motor vehicle wherein said vehicle includes a body and wherein said method comprising the steps of:
    stacking a sonic horn with the headliner and the trim ring;
    stacking at least one fastener above the headliner in the at least one weld area to fasten the headliner to the body of the vehicle; and
    vibrating the sonic horn such that the trim ring and the headliner bond and weld together in at least one weld area.

2. The method of installing a trim ring to a headliner of a motor vehicle as set forth in claim 1, wherein said method further includes the step of providing a nest and said step of stacking the sonic horn with the headliner and the trim ring occurs on the nest such that the trim ring, the headliner, and the sonic horn are supported by the nest.

3. The method of installing a trim ring to a headliner of a motor vehicle as set forth in claim 1, wherein said step of vibrating the sonic horn such that the trim ring and the headliner bond and weld together in at least one weld area includes a plurality of weld areas disposed alone the trim ring.

4. The method of installing a trim ring to a headliner of a motor vehicle as set forth in claim 1, wherein said method further includes the step of providing at least one energy director between the trim ring and the headliner.

5. The method of installing a trim ring to a headliner of a motor vehicle as set forth in claim 4, wherein the at least one energy director includes plastic.

6. The method of installing a trim ring to a headliner of a motor vehicle as set forth in claim 1, wherein said step of stacking the sonic horn with the headliner and the trim ring further includes positioning the headliner between the sonic horn and the trim ring.

7. A method of installing a trim ring to a headliner of a motor vehicle including a body, said method comprising the steps of:
    stacking a sonic horn with the headliner and the trim ring;
    providing a nest wherein said step of stacking the sonic horn with the headliner and the trim ring occurs on the nest such that the trim ring, the headliner, and the sonic horn are supported by the nest;
    providing at least one energy director between the trim ring and the headliner;
    vibrating the sonic horn such that the trim ring and the headliner bond and weld together in at least one weld area; and
    stacking at least one fastener above the headliner in the at least one weld area to fasten the headliner to the body of the vehicle.

* * * * *